United States Patent Office 2,929,719
Patented Mar. 22, 1960

2,929,719

CITRUS PRODUCT AND PROCESS

Helen Walburn, Washington, D.C.

No Drawing. Application October 30, 1959
Serial No. 849,713

8 Claims. (Cl. 99—100)

This invention relates to a citrus product and process of producing the same. More particularly, this invention is concerned with a mixture of whole citrus fruits, separately pureed, separately treated and thereafter combined.

The therapeutic and healthful properties of citrus fruits in their entirety, have long been recognized. Citrus fruits contain only about 40 to 45% juice, the remainder being flavedo 8–10%, albedo 15–30%, rag and pulp 20–30% and seeds 0–4%. But heretofore only the citrus juice which constitutes less than half of the citrus fruit itself has been utilized to any appreciable extent by the consuming public. The non-juice portions of citrus fruit contain flavoring ingredients, flavones, bioflavonoids, protopectin and various other constituents which heretofore have been humanly nonedible and have not, therefore, been available in ordinary fresh citrus products in a humanly consumable form. Because almost all of the oil of citrus fruit is in the peel, consisting of many different substances which make up the flavor of lemon oil and orange oil, in particular, the peels are thus highly concentrated sources of this flavor. By the instant invention, whole, fresh, mixed citrus fruits are provided in a stable, palatable puree form whereby maximum delectability and food and health values of the complete fresh citrus fruits are preserved in the fresh state.

It is an object of this invention to provide a whole, fresh citrus fruit puree containing more than one variety of citrus fruit. It is a further object of this invention to provide whole, fresh citrus fruit puree containing the particulated peel, albedo, pulp and tissue of each variety of fruit surrounded by its own autogenous pectin and juice. An additional object is to provide a process for producing a whole, fresh mixed citrus fruit puree containing at least two varieties of citrus fruits which have been separately aged in the puree state. A still further object of this invention is to provide a whole, fresh, mixed citrus fruit puree product in liquid condition containing three or more varieties of citrus fruits in which the important bioflavonoids of at least two of said fruits are made palatable and useful in the fresh state. Other objects will be apparent to the expert in the art.

In the process of this invention, mature, whole, fresh fruits are washed to free them of superficial contamination and debris. Particularly suitable are orange, lemon and grapefruit in a numerical proportion, by volume, of 2, 1 and 1, respectively, although other proportions and other blends of two or more citrus fruits also may be amenable to this processing. The entire, whole orange, lemon and grapefruit are separately pureed. Thus not only the juice but the entire fruit with its outer peel, epicarp and hypoderm or flavedo, mesocarp or albedo, locules, locular wall, central placenta and seeds is processed. Because of the intensely bitter limonin which the seeds contain, it is sometimes desirable to remove some or all of the seeds before pureeing the fruit. A high speed rotary chopper-agitator such as a Waring Blendor is suitable for this operation. The purees are then suitably strained through a coarse sieve to remove large seed and other particles and then through a fine sieve to ensure uniformity. The sieve sizes are not critical and are selected to achieve satisfactory separation and throughput in conjunction with the plant equipment being utilized. The separate purees of orange, lemon and grapefruit are then maintained in a separated condition and aged by holding at room temperature several hours and, additionally, at refrigeration temperature, less than about 40° F. for at least one day. The temperature is limited only by the possibility of spoilage or shortened life of the product at the more elevated temperatures and at the lower temperature it is the intent that the product be in a liquid condition. The separately pureed whole citrus fruits are aged prior to mixing in two steps, as described above. The initial aging step is carried out at a temperature of about 70° F. for a period of from 1 to 12 hours, preferably from 1 to 8 hours. This aging may be accelerated in a commercial operation by employing higher temperatures for shorter periods of time. Thus, the separate purees may be aged at temperatures of at least 75° F. for a relatively short period of time and at temperatures in the range of from 90–100° F. for less than an hour or for about 15 minutes or less. The second aging step is carried out at temperatures in the range of 40–45° F. for a period of from about 1 to about 3 days. Lower temperatures; such as, for example, 35–37° F. may be employed, it being only necessary to employ a temperature at which, as stated above, the separate purees are in a liquid state.

Ordinarily, citrus juice contains water 86–92%, sugar 5–8% and pectin 1–2%, a pectin content far lower than that of the remainder of the fruit. Upon aging of the puree it is possible that additional pectin extracted from the remaining solids encases the pureed particles and insulates them against deterioration and cross esterification. The distinctive puree characteristics of the separate fruits are further enhanced by aging at the pH characteristic of the individual fruits which are about 2.8 to 4.3; for seedlings 2.8–3.6; pineapple Florida 3.3–3.9; Florida Valencia 3.1–4.3 and California Valencia 3.0–3.6. Lemons commonly have a lower pH of 2.11 to 2.48. Thus the particulated, pureed peel, albedo and tissue of each citrus fruit are separately encased and protected by autogenous pectin and juice whereby the individuality and palatability of the different varieties of citrus fruits are preserved and exhibited upon subsequent mixing of the separately aged purees. If desired, and especially in the case of grapefruit, the citrus oil content of the puree may be reduced by removing some of the peel, for example, about one-half of the grapefruit peel, before pureeing. The mixed citrus purees, two or more of which have been separately aged as above described before mixing, are then satisfactorily kept under refrigerated conditions at about 40° F. for from about one to four days. Preservatives such as sodium benzoate can be added to the puree or the puree may be frozen solid and maintained indefinitely at −32° F. Ordinarily, however, it suffices to merely refrigerate the mixed citrus puree prepared according to this invention, to have a shelf life, under refrigeration, of at least two weeks.

The treated mixed puree is a palatable beverage per se, but also is particularly desirable to fortify orange or other juices, to provide flavor, and new food values to other beverages. It is a useful fruit source in frozen confectionery, candy, jelly, jam, baked goods, icings, sauces, mayonnaise, puddings, stuffings and other food products.

Although the general mode of practicing this invention has been illustrated with all varieties of said citrus fruits separately pureed and aged, the advantageous results are obtained to some extent if at least two of the varieties of citrus fruits are separately pureed and aged and the remaining variety of citrus fruit is pureed and mixed before aging with the separately pureed and aged citrus fruits.

The varieties of citrus fruits which are enhanced by this processing are not limited except by commercial availability and discriminating taste. Most suitably, Valencia, navel or Florida pineapple orange, lemon and white grapefruit provide a widely acceptable flavored product. Applicable to this procedure, though less preferable, are other citrus fruits such as certain other varieties of the sweet orange processed in accordance with this invention.

Physical stability may, if desired, be modified, by the incorporation of vegetable gums or suspending agents, pectin, carob, acacia, carboxymethylcellulose, and the like.

The following examples by way of illustration are not to be construed as limiting the invention.

Example 1

Whole, fresh, mature oranges, lemons and grapefruit are carefully washed with water. About one-half of the grapefruit rind, but not appreciable albedo, is removed. The oranges, lemons and partially peel-free grapefruit are separately pureed, sieved to remove large particles, resieved through a finer sieve to establish homogeneity and separately aged at a temperature of about 70° F. for about 2 hours and then separately aged at 40–45° F. for about two days. Then the purees are blended in a proportion of about six parts of orange puree, six parts of grapefruit puree and one part of lemon puree by weight. The mixture exhibited characteristic properties of flavor and distinctiveness not possessed by a pureed mixture of fruits or mixture of separately blended but unaged purees.

Example 2

The steps of Example 1 were followed except that the separately obtained purees were immediately mixed without aging. This caused marked flavor changes and loss of distinctiveness of the separate fruit ingredients, thus producing an inferior product.

Example 3

Storing the product of Example 1 for eight days at 40–45° F. produced no decrease in organoleptically desirable characteristics.

Example 4

Storing the product of Example 2 for eight days at 40–45° F. produced no improvement in the flavor of the product which remained different from and inferior to the product of Example 3.

Example 5

Otherwise, like Example 1, maintaining the separated purees for 8 hours at 70° F. and for three days at 40–45° F. aging, and then mixing the separately aged purees to produce a highly stable, flavorful product which retained its properties during refrigeration for five more days.

Example 6

Pureeing a mixture of about five parts whole orange and one part whole lemon by weight and separately pureeing five parts of grapefruit by weight, the grapefruit having about one-half of its peel removed, and separately aging the sieved purees for one hour at room temperature, or about 70° F., and for three days at refrigeration temperature of about 37° F., followed by blending the purees and then maintaining the blended separately aged purees for an additional four days under refrigeration produced a product of demonstrable individuality and stability, physically and organoleptically.

Example 7

Mixing the product of Example 3 with orange juice in a volumetric ratio of about 1 to 5, respectively, gave a palatable beverage of distinctive flavor and high solids content.

Example 8

Mature, whole fresh oranges and lemons were separately pureed and aged for one hour at 75° F. and then two days under refrigeration at 45° F. The purees were than blended in a proportion of four parts of orange to one part of lemon on a volume basis. The blended mixture was found to retain individuality and stability, as compared with unaged blended puree which did not, upon testing after four days storage at refrigerator temperature.

Example 9

Whole fresh Valencia oranges and lemons were separately pureed and aged at 70° F. for one hour and then under refrigerated conditions at a temperature of 40° F. for three days. The purees were then blended in a proportion of four parts of orange to one part of lemon on a volume basis. The blended, separately aged purees, were then stored under refrigerated conditions at about 40–45° F. for four days. A highly palatable product was obtained.

Example 10

The process of Example 9 was repeated except that the mixture of separately aged purees, after blending, was then mixed with four parts by volume of separately pureed, fresh, but unaged white grapefruit. This blend was refrigerated for four days at 40–45° F. and a very palatable product was obtained.

Example 11

The mixture of separately aged purees of whole orange and lemon prepared according to Example 8 was mixed with a fresh, unaged puree of white grapefruit (Duncan) having about one-half of the peel removed before pureeing. The proportions of the purees mixed were, by volume, in the ratio of four parts orange, one part lemon and one part grapefruit. The mixture of the two separately aged and one unaged purees was stored under refrigerated conditions (about 40° F.) for two days. This resulted in a palatable beverage having a satisfactory distinctive flavor.

This application is a continuation-in-part of my co-pending application, Serial No. 723,102, filed March 24, 1958.

I claim:

1. A process of preparing a puree product consisting essentially of whole citrus fruits comprising, separately pureeing fresh, raw, whole orange, lemon and grapefruit, separately aging at least two of said purees, firstly, at a temperature of at least about 70° F. for a period of less than about twelve hours and, secondly, in a liquid state at a temperature of less than about 45° F. for a period of from about one to three days, and then mixing said separate purees.

2. A process of preparing a puree product consisting essentially of whole citrus fruits comprising, separately pureeing fresh, raw, whole orange, lemon and grapefruit, separately aging at least two of said purees, firstly, at a temperature in the range of from about 70–75° F. for a period of from about one to twelve hours and, secondly, at a temperature in the range of from about 40–45° F. for a period of from about one to three days, and then mixing said separate purees.

3. The process of claim 2 wherein said mixture of separate purees is stored at a temperature of about 40° F. for from about one to four days.

4. The process of claim 2 which includes the step of freezing said mixture of separate purees.

5. The process of claim 2 which includes the step of mixing fresh citrus fruit juice with said mixture of separate purees.

6. The process of claim 2 wherein about one-half of the peel of said grapefruit is removed and said fruit is then pureed.

7. A process of preparing a puree product consisting essentially of whole citrus fruits comprising, separately pureeing fresh, raw, whole orange, lemon and grapefruit, separately aging each of said purees, firstly, at a temperature in the range of from about 70–75° F. for a period of from about one to eight hours and, secondly, at a temperature in the range of from about 40–45° F. for a period of from about one to three days and then mixing said separately aged purees.

8. The process of claim 7 which includes the step of mixing fresh citrus fruit juice with said mixture of separately aged purees.

References Cited in the file of this patent

UNITED STATES PATENTS

| | | |
|---|---|---|
| 2,086,911 | Hill | July 13, 1937 |
| 2,328,554 | Heyman | Sept. 7, 1943 |

OTHER REFERENCES

Fruit and Vegetable Juice Production, Tressler and Joslyn, page 594.